United States Patent
Jackson et al.

(10) Patent No.: US 7,690,602 B2
(45) Date of Patent: Apr. 6, 2010

(54) SATELLITE ACTIVE MOTION DAMPING

(75) Inventors: Louis R. Jackson, Peoria, AZ (US); Bruce W. Rogers, Glendale, AZ (US); Robert E. Winkel, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1033 days.

(21) Appl. No.: 11/394,037

(22) Filed: Mar. 29, 2006

(65) Prior Publication Data

US 2007/0252044 A1    Nov. 1, 2007

(51) Int. Cl.
*B64G 1/28* (2006.01)

(52) U.S. Cl. .................. 244/165; 244/170; 244/158.6

(58) Field of Classification Search .............. 244/158.1, 244/158.6, 165, 164, 170
See application file for complete search history.

(56) References Cited

U.S. PATENT DOCUMENTS

| | | | |
|---|---|---|---|
| 4,260,942 A | | 4/1981 | Fleming |
| 4,949,922 A | * | 8/1990 | Rosen .................. 244/168 |
| 6,021,979 A | * | 2/2000 | Bender et al. ............ 244/164 |
| 6,138,952 A | | 10/2000 | Holmes |
| 6,517,029 B1 | | 2/2003 | Holmes |
| 2005/0125111 A1 | | 6/2005 | Bonn et al. |

OTHER PUBLICATIONS

EP Search Report, 07105077.7 dated Apr. 25, 2008.

* cited by examiner

*Primary Examiner*—Timothy D Collins
(74) *Attorney, Agent, or Firm*—Ingrassia Fisher & Lorenz, P.C.

(57) ABSTRACT

Methods and apparatus are provided for active motion damping of a spacecraft whose attitude control system (SACS) has experienced a partial failure. In a preferred embodiment, the apparatus comprises, an attitude control processor (ACP), a motion damping controller (MDC) coupled to the ACP, a control moment gyro (CMG) comprising a gimbal loop controller (GLC) coupled to the MDC and a gimbal motor with input coupled to the GLC and gyroscopic torque output coupled to the satellite. Normally, a gimbal rate command (GRC) from the ACP passes to the GLC for execution to rotate the CMG gimbal and the coupled satellite. If the ACP output becomes invalid, the MDC assumes control and can modify CMG operation in several ways to safely decelerate a moving satellite without hazardous mechanical stress. Following such active motion damping, the CMG remains quiescent until a RESET is received whereby further valid GRCs are then executable.

5 Claims, 5 Drawing Sheets

US 7,690,602 B2

SATELLITE ACTIVE MOTION DAMPING

TECHNICAL FIELD

The present invention generally relates to attitude control systems for satellites and other space vehicles, and more particularly relates to active motion damping of such systems.

BACKGROUND

Control moment gyros (CMG's) are widely used in attitude control systems of satellites and other space vehicles. The words "spacecraft", "satellite" and "space vehicle" are used synonymously herein. Persons of skill in the art understand that multiple CMG's are often used to permit orientation control in three dimensions. However, for convenience of explanation, it is assumed herein that the orientation system is one dimensional, i.e., employing only one CMG. Persons of skill in the art will understand that multiple CMG's can be employed to provide for orientation in three dimensions and that the present invention applies to such multidimensional arrangements.

FIG. 1 is a simplified schematic block diagram illustrating conventional prior art spacecraft attitude control system 20 employing CMG 22 used to orient spacecraft 24 in space. Spacecraft Control System 26 decides what orientation that the satellite should assume and issues an appropriate command over link 261 to Attitude Control Processor (ACP) 28. ACP 28 takes into account information received from rate sensors 241 and attitude sensors 242 on spacecraft 24 concerning the current rate at which spacecraft 24 is rotating (if at all) and the orientation (attitude) of the axis of rotation, and then issues a rate command (e.g., in radians per second or other convenient rotational units) over link 29 to CMG 22 to cause spacecraft 24 to rotate to the new orientation desired by SCS 26. CMG 22 comprises a rotating mass held in a moveable gimbal which is in turn mechanically coupled to spacecraft 24. When the gimbal is rotated in response to the rate command received by CMG 22, the gimbal processes thereby imparting torque 25 to spacecraft 24 causing it to begin rotating since the total momentum of the overall system is conserved. Based on the feedback to ACP 28 from rate and spacecraft attitude sensors 241, 242 or other sensors within CMG 22, the ACP modifies the rate command issued to CMG 22 to control the acceleration and rate of the spacecraft. At the completion of the maneuver commands are issued to CMG 22 to return it to its quiescent state and stop the rotation of spacecraft 24. A similar mechanism permits exchange of momentum from the spacecraft to the CMG to counter external torque disturbances on the spacecraft. Under ordinary circumstances such an arrangement works well.

FIG. 2 is a simplified schematic block diagram of attitude control system 20 of FIG. 1 showing further details concerning CMG 22. Like reference numbers are used for like elements. CMG 22 comprises: (i) adder 30 which receives gimbal rate command (CRC) 46 from ACP 28 over link 29, (ii) error amplifier 32 having its input coupled to the output of adder 30 via link 31, (iii) filter 34 having its input coupled to the output of error amplifier 32 via link 33, (iv) limiter 36 having its input coupled to the output of filter 34 via link 35, (v) motor driver 38 whose input is coupled to the output of limiter 36 via link 37, and (vi) gimbal motor 40 whose input is coupled to the output of driver 38 via link 39. Filter 34 is used to compensate for vibrational resonance modes that may occur in the spacecraft so that the overall attitude control system is unconditionally stable. Limiter 36 insures that current drive Id to gimbal motor 40 does not exceed the maximum safe current Imax for driver 38 and/or motor 40. CMG 22 further comprises inner gimbal assembly 42 which is mechanically coupled to gimbal motor 40 and to spacecraft 24. Gimbal motor 40 delivers motor torque (MT) 41 to inner gimbal assembly 42. Inner gimbal assembly 42 delivers gyroscopic torque (GT) 25 to spacecraft 24. Inner gimbal assembly 42 can also receive reaction torque (RT) 27 from spacecraft 24 if spacecraft 24 is rotating. In this situation, the spacecraft is trying to turn inner gimbal assembly 42 instead of the other way around. tachometer 44 (abbreviated as "TACH") is coupled to inner gimbal assembly 42 via link 43 and measures the rate of rotation of inner gimbal assembly 42 (and also indirectly the spacecraft rotation rate) and communicates measured rate feedback values (RFB) 49 back to ADDER 30 via feedback link 45. Elements 30, 32, 34, 36, 38 make up gimbal loop controller 23 which receives gimbal rate commands (GRC) 46 over link 29 from ACP 28 and gimbal rate feedback (RFB) 49 over link 45 from TACH 44 and delivers motor drive current Id 48 over link 39 to motor 40 so as to reduce the difference between gimbal rate command (GRC) 46 and rate feedback (RFB) 49 to zero, thereby supplying motor torque (MT) 41 to rotate the CMG gimbal at the desired rotation rate corresponding to GRC 46 and producing gyroscopic torque (GT) 25 acting on spacecraft 24. Gimbal Loop Controller 23 is desirably a Type 1 controller, that is, it includes summed integrating and linear amplifiers within error amplifier 32. This integrating action permits the control system to reject the effects of the reaction torque (RT) 27. This is conventional.

A problem with such systems is that if a spacecraft is moving as a result of prior gimbal rate command (GRC) 46 having been issued to CMG 22 from ACP 28, and ACP 28 or some other element of the system has a malfunction or reaches a time-out so that gimbal rate command (GRC) 46 being issued by ACP 28 drops to zero or otherwise becomes invalid, then spacecraft 24 and CMG 22 can be subjected to very severe mechanical stresses. For example, if GRC 46 is suddenly removed or becomes zero, then only RFB signal 49 is reaching adder 30 and gimbal loop control 23 reverses the direction of motor torque (MT) 41 as it tries to drive RFB 49 to zero. This can result in a sudden and potentially harmful deceleration of inner gimbal assembly 42 and spacecraft 24. Further, if driver 38 is disabled by command or as a failure mitigation response, the motor torque (MT) 41 will become zero but the reaction torque (RT) 27 remains, potentially resulting in a large acceleration of the gimbal in the opposite direction. This process can also result in damaging stresses to the CMG system and the spacecraft structure. Many high agility attitude control systems have historically used CMG's with geared drive motors, whose back-electro-motive-force ($V_{bemf}$) from motor 40 could be used in a dynamic braking circuit arrangement to passively limit the gimbal rate of a CMG caused by vehicle reaction torque. But some spacecraft employ non-geared, direct drive gimbal motors, where this approach is not practical. Hence, the problem is exacerbated with these vehicles. Accordingly, there continues to be a need for satellite active motion damping systems and methods that mitigate or avoid the physical stress, torque errors and other problems arising from various kinds of CMG gimbal drive interruptions.

Accordingly, it is desirable to provide improved active motion damping means and methods for satellites and other spacecraft. In addition, it is desirable that the apparatus and method be simple, rugged, reliable and require minimal change in the satellite hardware. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for safe attitude control of a spacecraft. The apparatus comprises an attitude control processor (ACP) for generating attitude change commands, a control moment gyro (CMG) coupled to the spacecraft for executing the attitude change commands to alter the orientation of the spacecraft, and a motion damping controller (MDC) coupled between the CMG and the ACP and adapted to: (i) during normal of operation of the spacecraft attitude control system, receive attitude change commands from the ACP and pass on such commands to the CMG for execution, and (ii) during an emergency mode of operation when such attitude change commands are invalid, unavailable or interrupted, modifying operation of the CMG to gradually reduce any then existing rotation of the spacecraft to a predetermined quiescent state, as for example, zero rotation rate.

A method is provided for safely operating a satellite attitude control system employing at least one control moment gyro (CMG) responsive to attitude change commands. The method comprises, receiving an attitude change command, determining whether the received attitude change command is valid, and if YES (TRUE), having the CMG execute the valid attitude change command, and if NO (FALSE), modifying operation of the CMG to enable active motion damping (AMD) wherein rotation of the satellite is gradually changed to a quiescent state without exceeding a predetermined safe rate of change of rotation.

BRIEF DESCRIPTION OF THE DRAWINGS

The present invention will hereinafter be described in conjunction with the following drawing figures, wherein like numerals denote like elements.

DETAILED DESCRIPTION

Figure 1:
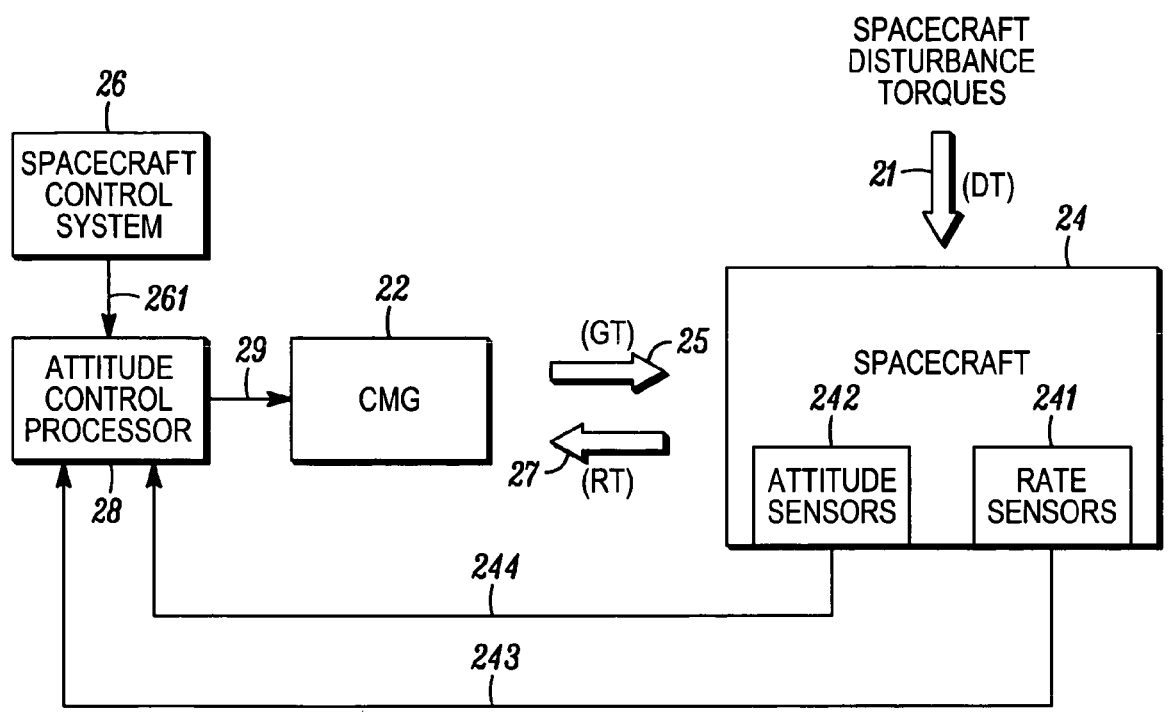
FIG. 1 is a simplified schematic block diagram illustrating a conventional prior art spacecraft attitude control system employing a CMG used to orient a spacecraft in space.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

For simplicity and clarity of illustration, the drawing figures illustrate the general manner of construction and method of operation, and descriptions and details of well-known features and techniques may be omitted to avoid unnecessarily obscuring the invention. Additionally, elements in the drawings figures are not necessarily drawn to scale. For example, the dimensions of some of the elements or regions in the figures may be exaggerated relative to other elements or regions to help improve understanding of embodiments of the invention The terms "first," "second," "third," "fourth" and the like in the description and the claims, if any, may be used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have" and any variations thereof, are intended to cover non-exclusive inclusions, such that a process, method, article, or apparatus that comprises a list of elements is not necessarily limited to those elements, but may include other elements not expressly listed or inherent to such process, method, article, or apparatus. The terms "left," right," "in," "out," "front," "back," "up," "down," "top," "bottom," "over," "under," "above," "below" and the like in the description and the claims, if any, are used for describing relative positions and not necessarily for describing permanent positions in space. It is to be understood that the embodiments of the invention described herein are, for example, capable of operation in other orientations than those illustrated or otherwise described herein. The term "coupled," as used herein, is defined as directly or indirectly connected in an electrical or non-electrical manner.

Figure 2:
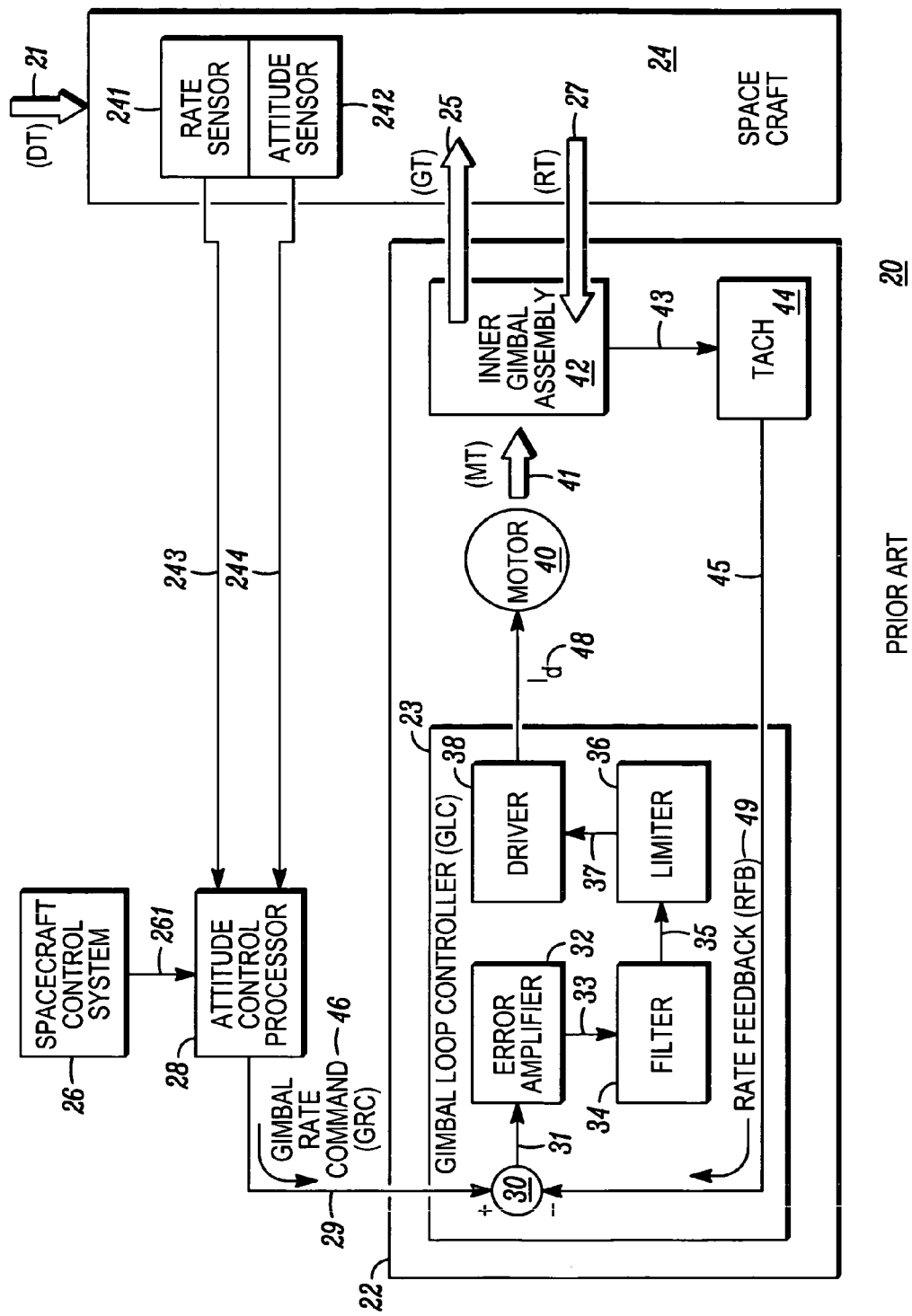
FIG. 2 is a simplified schematic block diagram of the attitude control system of FIG. 1 showing further details concerning the CMG.
Figure 3:
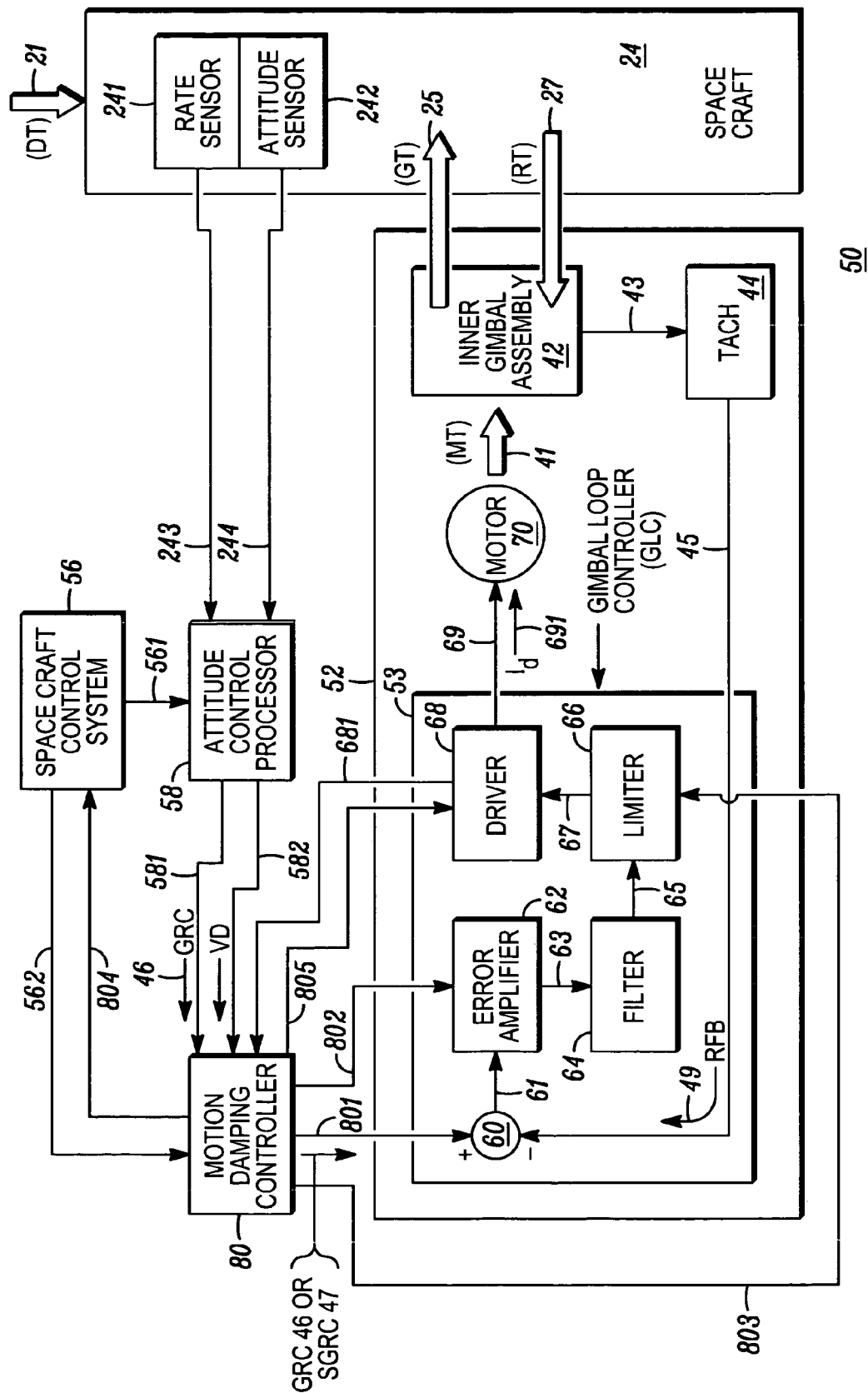
FIG. 3 is a simplified schematic block diagram analogous to that of FIG. 2 but of a system for providing active motion damping of the satellite according to an embodiment of the present invention.

FIG. 3 is a simplified schematic block diagram analogous to that of FIG. 2 but of system 50 providing active motion damping of satellite 24 according to several embodiments of the present invention. Like reference numbers are used for like elements in systems 50 and 20 and analogous elements are also identified. System 50 comprises spacecraft control system (SCS) 56 analogous to SCS 26 of system 20, gimbal loop controller (GLC) 53 analogous to GLC 23 of system 20, attitude control processor (ACP) 58 analogous to ACP 28 of system 20, motor 70 analogous to motor 40 of system 20, inner gimbal assembly (IGA) 42 similar to IGA 42 of system 20, and TACH 44 similar to TACH 44 of system 20. IGA 42 is mechanically coupled to spacecraft 24 in substantially the same way as in system 20, and provides gyroscopic torque (GT) 25 thereto and receives reaction torque (RT) 27 therefrom. System 50 also included active motion damping controller (MDC) 80 which has no counterpart in system 20 of FIG. 1. Gimbal loop controller (GLC) 53 comprises adder 60, error amplifier 62, filter 64, limiter 66 and motor driver 68, generally analogous to elements 30, 32, 34, 36, 38 of system 20 but configured to provide active motion damping according to various implementations of the present invention. Elements 60, 62, 64, 66, 68 are serially coupled via links 61, 63, 65 and 67, respectively and to motor 70 via link 69, analogous to links 31, 33, 35, 37 and 39 respectively. SCS 56 feeds orientation instructions or commands to ACP 58 via link 561 analogous to link 261 of system 20. ACP 58 sends conventional gimbal rate command (GRC) 46 to MDC 80 over link 581 analogous to link 29 and also provides "valid data" (VD) indication via link 582 to MDC 80. The purpose of the signal or state coupled via link 582 to MDC 80 is to indicate that the rate command(s) on link 581 is a valid rate command even if of magnitude zero. MDC 80 stands between ACP 58 and gimbal loop controller (GLC) 53 and manages the satellite active motion damping in the event of an upstream attitude control failure. MDC 80 is coupled to adder 60 via link 801.

In normal operation, MDC 80 passes valid gimbal rate command (GRC) 46 to adder 60 and during active motion damping may provide a synthetic gimbal rate command (SGRC) 47 to adder 60 depending upon the mode of operation desired for achieving active motion damping. MDC 80 is also conveniently but not essentially coupled to error amplifier 62 via link 802, to limiter 66 via link 803 and to driver 68 via link 805 so as to be able, in further modes of operation, to alter the properties of the various elements of gimbal loop controller (GLC) 53 to achieve active motion damping and/or disable GLC 53 and CMG 52. In a further embodiment, MDC 80 desirably but not essentially receives information via link 681 concerning drive current Id being supplied by driver 68 to motor 70 over link 69. TACH 44 provides actual gimbal rate (and therefore satellite rate) feedback (RFB) 49 via link 45 to adder 60. The input to error amplifier 62 over link 61 from adder 60 is the difference between desired gimbal rate commanded (e.g., GRC 46 or SGRC 47) on link 801, which may be actual (GRC 46) or synthesized (SGRC 47), coming from MDC 80 and actual rate feedback (RFB) 49 coming for example from TACH 44. Satellite or spacecraft rotation rate information may also be obtained from rate sensor 241.

MDC 80 has several possible modes of operation, any of which are capable of providing active motion damping of system 50 so that spacecraft 24 is maintained in or gently returned to a quiescent state in the event of an upstream attitude control system failure detected by MDC 80. For example and not intended to be limiting, when an upstream failure would ordinarily result in IGA 42 and/or spacecraft 24 being subjected to potentially hazardous stress because GRC 46 on link 581 drops suddenly to zero or otherwise becomes invalid, then, in a first mode of operation, MDC 80 can provide synthesized gimbal rate command (SGRC) 47 on link 801 and by slowly tapering SGRC 47 to zero, avoid any abrupt maneuvers that might produce undesired mechanical stress on IGA 42 and/or spacecraft 24. The maximum safe rate at which SGRC 47 can be tapered to zero will depend upon the characteristics of the particular spacecraft and CMG being used. Persons of skill in the art will understand how to choose such "safe" rate depending upon their particular circumstances. As used here in the term "safe" is intended to refer to a gimbal rate that avoids potentially hazardous deceleration or acceleration (i.e., "unsafe") forces on satellite 24 and/or the elements of CMG 52. In this mode of operation, GLC 53 operates in substantially the same manner as GLC 23, but with protective synthesized input SGRC 47 that provides safe active motion damping of system 50.

In a further implementation, in the event of input GRC 46 failure on link 581, MDC 80 can use link 802 to alter the transfer characteristics of error amplifier 62 so that rapid reversals of rotation of inner gimbal assembly 42 are avoided even if SGRC 47 is not provided on link 801. In a third mode of operation which may or may not include use of link 802, undesirably violent (e.g., unsafe) maneuvers can be avoided following a loss of input GRC 46 from ACP 58 by utilizing link 803 from MDC 80 to limiter 66 whereby MDC 80 reduces the magnitude of Imax that is allowed to be supplied to motor 70 to a value small enough to mitigate the unsafe mechanical stress on IGA 42 and spacecraft 24 that might occur if GRC 46 on link 801 drops suddenly to zero or other improper value as a result of some upstream fault in system 50. The foregoing modes of operation may be exercised independently or may be combined in various ways by the system designer, to provide the desired degree of active motion damping. Optional link 681 from motor driver 68 back to MDC 80 provides MDC 80 with information on the actual motor drive current Id being supplied by driver 68 to motor 70. This information is useful in operating MDC 80 and GLC 53 so as to bring spacecraft 24 to a gentle stop. Links 802, 803 and 681 are useful in providing additional degrees of freedom for active motion damping but are not essential. Link 804 is desirably provided from MDC 80 to spacecraft control system (SCS) 56 and/or other portions of spacecraft 24 so that MDC 80 can notify SCS 56 and/or other portions of spacecraft 24 that it has detected an improper value of GRC 46 and switched MDC 80 and GLC 53 into active motion damping (AMD) mode of operation (i.e., AMD "ON"). MDC 80 stays in such active damping mode operation until it receives a RESET command via link 562 from SCS 56 (or from elsewhere on spacecraft 24) and detects a valid data flag (or equivalent) via 582, whereupon MDC 80 returns system 50 to normal operation (i.e., AMD "OFF"), and resumes passing gimbal rate commands 46 received over link 561, for example, substantially directly to adder 60 over link 801.

Figure 4:
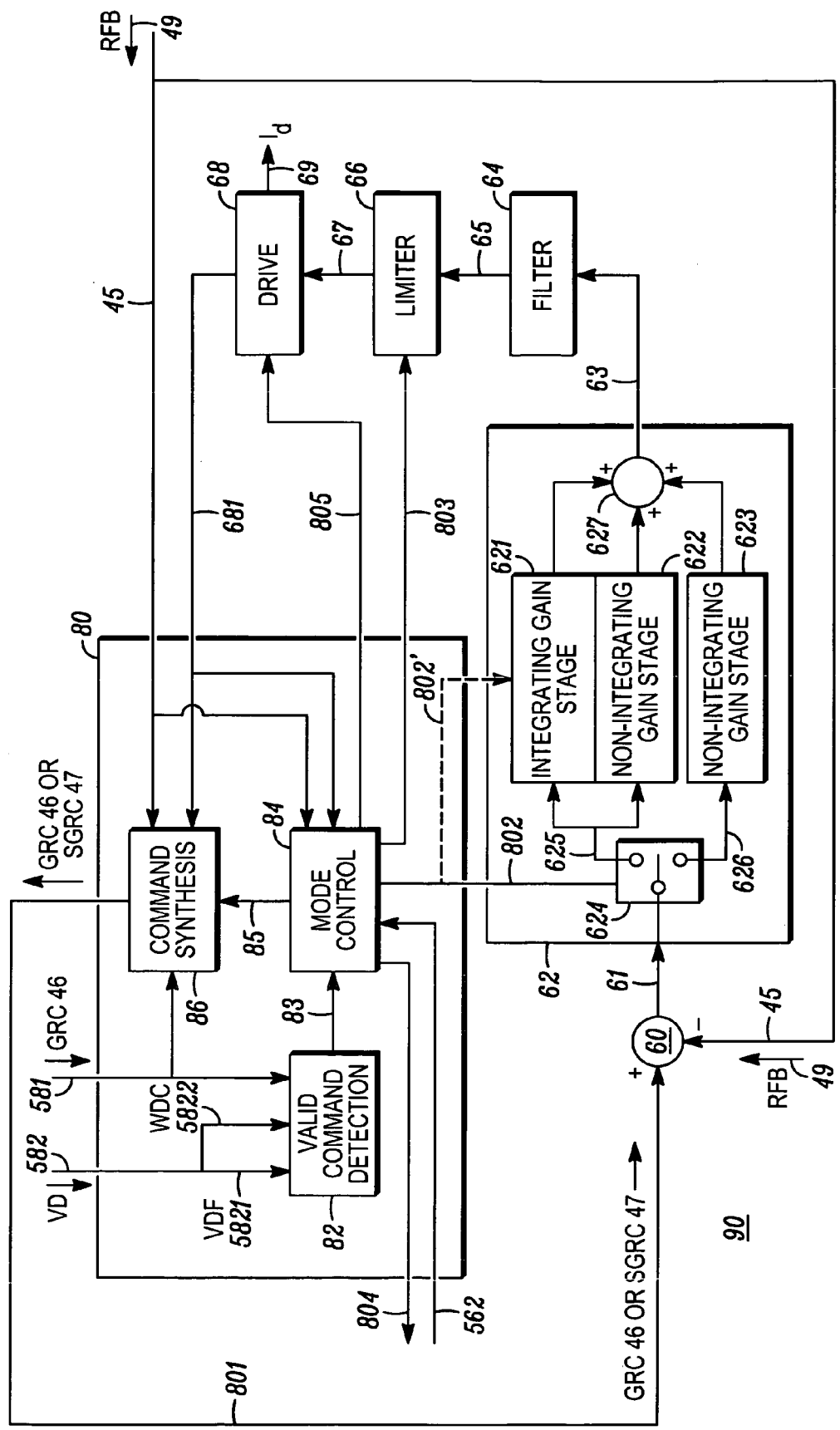
FIG. 4 is a simplified schematic block diagram of a portion of the system of FIG. 3 according to further embodiments of the present invention and showing further details.

FIG. 4 is a simplified schematic block diagram of portion 90 of system 50 of FIG. 3 according to further embodiments of the present invention and showing further details. Portion 90 illustrates the inner workings of motion damping controller (MDC) 80 according to further embodiments of the present invention. Portion 90 also shows error amplifier 62 and details thereof illustrating optional but not essential further features thereof. Portion 90 also illustrates further details of how MDC 80 can interact with limiter 66 and driver 68 described above. Portion 90 of MDC 80 and associated signals (e.g., GRC, VDF, WDC, RFB, Id, Imax, etc.), may be of analog or digital makeup or a combination thereof. Accordingly, portion 90 and MDC 80 are described functionally since persons of skill in the art will understand based on such functional description how to provide appropriate hardware in either analog Cr digital or combined form to execute such functions without undue experimentation.

Motion damping controller (MDC) 80 comprises valid command detection function (VCDF) 82, mode control function (MCF) 84 and command synthesis function (CSF) 86. VCDF 82 is coupled to MCF 84 by link 83 and MCF 84 is coupled to CSF 86 via link 85. The purpose of VCDF 82 is to decide when incoming GRC 46 on link 581 is valid or erroneous and pass this result along to mode control function (MCF) 84. VCDF 82 receives gimbal rate command (GRC) 46 via link 581 from attitude control processor (ACP) 58. GRC 46 is also sent to command synthesis function (CSF) 86. VCDF 82 also receives valid data (VD) information via link 582 from ACP 58 in one or the other of several forms. Links 581, 582 may be a bus or include several connection carrying different signals. Either arrangement is useful. For example, valid data (VD) input from link 582 may include a watch-dog clock (WDC) signal on connection 5822 and/or a valid data flag (VDF) on connection 5821, or these different signals maybe multiplexed on the same connection, according to the desires of the designer. The WDC signal on connection 5822 conveniently identifies those time intervals during which data incoming on link 581 is deemed to be valid data, so that MDC 80 can recognize any GRC signals received on link 581 outside of such time intervals as being invalid data. The valid data flag appearing on connection 5821 tells MDC 80 that data arriving on link 581 while VDF is set to the "valid" state, is to be considered as a valid gimbal rate command (GRC). Either or both of VDF and WDC may be used to facilitate MDC 80 determining that a received GRC is valid or invalid, so that MDC 80 can react appropriately. Persons of skill in the art will understand based on the description herein that these are merely illustrative arrangements for detecting valid or invalid gimbal rate commands (GRCs) and are not intended to be limiting and that many other arrangements well known in the art can also be used. Non-limiting examples of such other methods include, redundant signaling, testing the GRC command itself to see whether it matches a predetermined set of stored criteria such as for example, signal length, magnitude, repetition rate, bit length, included characters, excluded characters, format, parity checks and so forth. Thus, even if VD link 582 is omitted, VCDF 82 may verify the validity of GRC 46 arriving via link 581 by applying such tests as are listed above or others well known in the art. The particular choice being up to the system designer. It is only important that the validity or invalidity of arriving GRC data be verifiable.

VCDF 82 sends the results of its "valid" or "invalid" data determination to mode control function (MCF) 84. If GRC 46 received by VCDF 82 (and CSF 86) is valid, VCDF 82 notifies mode control function (MCF) 84 which then instructs command synthesis function (CSF) 86 to pass GRC 46 received from link 581 to adder 60 of gimbal loop controller 53 over link 801 and system 50 operates in the substantially the conventional manner to reorient spacecraft 24 in accordance with received GRC 46. While GRC 46 is valid, normal operation continues. MDC 80 may optionally send a message to spacecraft control system (SCS) 56 via link 804 indicating that system 50 is operating normally (i.e., "AMD OFF" status), or normal operation may be presumed in the absence of active motion damping (AMD), depending on the choice of the designer.

In the event that mode control function (MCF) 84 receives an "invalid" data indication from VCDF 82, then MCF 84 causes system 50 to change to active motion damping (AMD) mode or configuration, i.e., to enter "AMD ON" status, using for example one or more or a combination of the AMD modes of operation described herein. MCF 84 desirably sends an "AMD ON" status signal or flag to SCS 56 and/or spacecraft 24 via link 804 so that the spacecraft knows that there has been a valid data failure and that a safe shut-down regime (e.g., AMD ON) is in operation. MCF 84 then selects one or more or a combination of potential modes of operation for active motion damping (AMD). These different modes of operation may be hard wired, that is, selected in advance by the system designer or operator so that only one or the other or a smaller subset of the different possible modes of AMD operation is available. Alternatively, the mode selection may be programmable, that is selectable by for example, spacecraft control system (SCS) 56 or a ground controller via SCS 56, depending upon the individual circumstances. Either arrangement is useful. For convenience of explanation and not intended to be limiting, it is assumed in the discussion that follows, that several and even overlapping modes of operation are available for use.

For example and not intended to be limiting, in a first mode of operation according to an embodiment of the present invention, as soon as valid data is lost, MCF 84 instructs CSF 86 via link 85 to synthesize a gimbal rate command signal (e.g., SGRC 47) to be sent over link 801 to adder 60 of gimbal loop controller 53 (see FIG. 3). In such situation, input switch 624 of error amplifier 62 shown in FIG. 4 should be in output position 625 corresponding to normal operation of GLC 53, wherein error amplifier 62 desirably comprises integrating gain stage 621 and non-integrating gain stage 622 arranged in parallel with their outputs summed by adder 627 and delivered to output link 63 for further use by GLC 53. Such an arrangement is referred to as a "Type-1" control system. CSF 86 desirably incorporates time delay and/or memory so that the initial SGRC it generates after valid data is lost, can correspond approximately to the last valid GRC value so that immediate sharp reorientation transients are avoided. Alternatively, and especially when considerable time may have elapsed since the last valid command and other factors may have altered the satellite rotation rate, CSF 86 may determined what GRC would correspond to the then current rotation rate and use such as the initial synthesized rate to avoid any immediate torque transient following the loss of valid data. Thereafter, CSF 86 reduces the SGRC value to safely bring the satellite to a stop without significant mechanical stress, which is referred to herein as safe active motion damping. The safe rate and time duration of such decay will depend upon the initial conditions when valid data is lost and the properties of the particular satellite being used. Persons of skill in the art will understand based on the teachings herein how to choose an appropriate safe satellite or spacecraft wind-down rate and duration. Wind-down can be linear or non-linear as desired by the designer.

In a second mode of operation according to another embodiment of the present invention, MCF 84 may accomplish active motion damping by use of link 802 to error amplifier 62 either alone or in combination with an SGRC to adder 60 provided by command synthesis function (CSF) 86. Either arrangement is useful. In this second mode of operation, MCF 84 uses link 802 to set switch 624 at the input of error amplifier 62 to output position 626 so that the output of adder 60 is fed just to non-integrating gain stage 623 from where it passes through adder 627 to output link 63 of error amplifier 62. This changes the transfer function of error amplifier 62 so that gimbal loop controller 53 becomes a Type 0 control system whereby the rate control loop cannot reject the disturbance presented by the reaction torque (RT) 27, but instead develops a steady state rate error as a result of the reaction torque which is a nearly linear function thereof. The gain of stage 623 will determine the error rate thus developed, being chosen to limit the gimbal rate to a safe value. Control loop 53 will generate motor torque 41 approximately equal to reaction torque 27 at some nonzero gimbal rate, thus providing an active braking function to the inner gimbal assembly 42. Inner gimbal assembly 42 will be forced back to a position where the reaction torque 27 is zero, which in this case should correspond to zero inertial rate on spacecraft 24. The result is that active motion damping in this mode of operation safely brings satellite 24 to a stop. While error amplifier 62 is shown in this implementation as comprising two non-integrating gain stages 622, 623, this is not essential. This arrangement is convenient when it is desired that the transfer function of non integrating gain stage 623 used for active motion damping be substantially different than that of stage 622 used in conjunction with integrating gain stage 621 during normal operation. However, the use of second non-integrating gain stage 623 may be avoided by having mode control function (MCF) 84 use optional link 802' to disable integrating gain stage 621 and, if needs be, reset the properties of non-integrating gain stage 622 for active motion damping. Either arrangement is useful. In the latter circumstances, input switch 624 may be left in output position 625 or replaced by a hardwired connection.

According to a third mode of operation according to an additional embodiment of the present invention, either alone or in conjunction with the first and second modes of operation, MCF 84 uses link 803 to adjust limiter 66 so that the maximum current Imax delivered to motor 70 by motor driver 68 (see FIG. 3) is reduced. The reduction in Imax may be varied with time. Even if no SGRC is provided to adder 60, so that its only input is FRB 49, which would ordinarily cause GLC 53 to try to generate motor torque 41 and gyroscopic torque 25 equal in magnitude to and opposing reaction torque 27, the severe mechanical stress that this could ordinarily produce is avoided by limiting the maximum current Imax that motor driver 68 can supply to gimbal motor 70. Thus, modifying the properties of limiter 66 by using link 803 can achieve the desired safe shut-down of system 50, either by itself or in combination with the first and/or second modes of operation already described. Once system 50 has brought satellite 24 to a stop or to such other predetermined condition as may be built into motion damping controller 80, then system 50 desirably remains in a quiescent state until mode control function 84 receives a RESET command via link 562 from SCS 56 or other portions of spacecraft 24 and VCDF 82 determines that valid rate commands are once again available to MDC 8Q whereupon, MCF 84 returns MDC 80 to normal operation wherein GRC 46 is passed through CSF 86 to adder 60 and input switch 624 of error amplifier 62 is reset to normal operation output position 625 and optional link 802', if used, restores stages 621, 622 to their normal functions for Type 1 operation.

Figure 5:
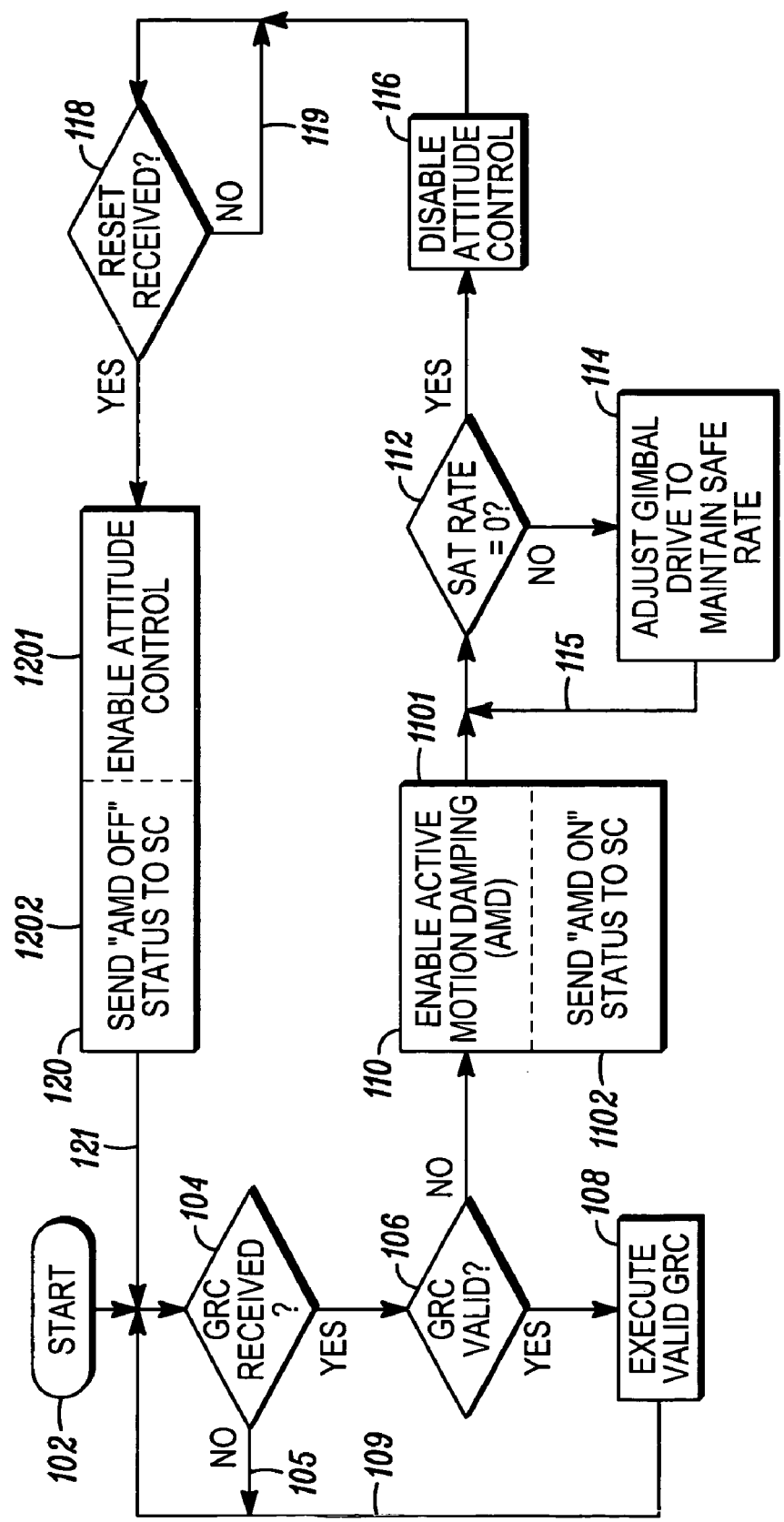
FIG. 5 is a simplified flow chart illustrating a method of providing satellite active motion damping according to a still further embodiment of the present invention.

FIG. 5 is a simplified flow chart illustrating method 100 of providing satellite active motion damping according to a still further embodiment of the present invention. Method 100 begins with START 102 which ordinarily occurs on power-up, and initial query 104 wherein it is determined whether or not a gimbal rate command (GRC) has been received, e.g., GRC 46 from ACP 58. If the outcome of query 104 is NO (FALSE), then method 100 returns to start 102 as shown by path 105. Method 100 will remain in this loop until the outcome of query 104 is YES, whereupon it advances to query 106 in which, for example, VCDF 82 or other test function determines whether the received GRC is valid. If the outcome of query 106 is YES (TRUE), then method 100 proceeds to EXECUTE VALID GRC step 108, wherein system 50 carries out the received GRC and, as shown by path 109, returns to START 102. If the outcome of query 106 is NO (FALSE), the method 100 proceeds to step 110 comprising sub-steps 1101 and 1102 that may be executed in either order. In step 110 active motion damping (AMD) is enabled, e.g., by an appropriate signal over link 83 from VCDF 82 to mode control function (MCF) 84 so that MCF 84 or an equivalent function, in either order, sends an "AMD ON" signal via link 804 to spacecraft (SC) 24 (e.g. to SCS 56 or other control authority), and selects one or the other or a combination of the active damping modes described above. For convenience of description of method 100, it is assumed herein that MCF 84 selects the first mode described above wherein SGRC 47 will be provided over link 801. Query 112 is desirably performed to determine whether spacecraft 24 is already moving, using for example rate feedback 49, gimbal motor drive current 69 and/or the output of rate sensor 241 (see FIG. 3 or 4). The observed rotation rate is referred as the satellite rotation rate abbreviated in FIG. 5 as "SAT RATE.". If the outcome of query 112 is YES (TRUE) because SAT RATE equals zero, indicating that spacecraft 24 and IGA 42 are not rotating, then no damping action is needed and method 100 proceeds to step 116, wherein attitude control is disabled by any convenient means, as for example and not intended to be limiting, setting SGRC equal to zero or disabling driver 68 via link 805, or setting switch 624 via link 802 to an intermediate (open) position or any other suitable arrangement. If however, spacecraft 24 and/or IGA 42 are rotating at the time of valid data loss, then the outcome of query 112 will be NO (FALSE) and method 100 proceeds to step 114 wherein, in this example, SGRC is adjusted to reduce gimbal drive current Id so that the torque on IGA 42 and on satellite 24 remain at or below a safe level set by the system designer or operator. Alternatively, in further implementations employing some of the other modes of operation previously described, error amplifier 62 and/or current limiter 66 may be modified or combinations thereof used to limit the maximum deceleration and/or drive current Id to which the satellite is subjected. The "safe" rate need not be a single rate but may be time varying or condition varying depending upon the satellite's circumstances when valid data is lost. In a further implementation, this information may be hard-wired or stored in one or more look-up tables in CSF 86 or MCF 84 or elsewhere. Any convenient arrangement may be used for setting the safe acceleration/deceleration rate. When there is a non-zero rate at data loss, method 100 stays in loop 112, 114 until the satellite has been brought to rest and SAT RATE=0 or brought to any other quiescent state corresponding to a non-zero pre-selected value of SAT RATE chosen by the designer or operator, wherein the outcome of query 112 is YES (TRUE) and method 100 advances to step 116 wherein attitude control is disabled. Method 100 then proceeds to query 118 wherein it is determined whether or not a RESET command has been received, e.g., via link 562 from SCS 56 or such other spacecraft (SC) entity as may have been assigned responsibility for reactivating the attitude control system. As long as the outcome of query 118 is NO (FALSE), system 50 remains in the AMD ON quiescent state as shown by path 119. When the outcome of query 118 is YES indicating that a RESET command has been received by MDC 80, then method 100 proceeds to step 120 wherein sub-step 1201 and optional sub-step 1202 are executed in either order. In sub-step 1201, adaptive motion damping is turned OFF and normal attitude control is re-enabled, for example, by setting error amplifier 62 back to its normal operation settings via link 802, 802' and/or limiter 66 back to its normal operation settings via link 803 and/or driver 68 back to its normal operation setting via link 805, if any have been changed, and instructing CSF 68 to pass incoming GRC 46 to adder 60 along link 801. Optional step 1202 may also be executed wherein MDC 80 sends an "AMD OFF" signal to SCS 56 or other supervisory elements (collectively spacecraft (SC) 24) so that it is known by the spacecraft operating system that MDC 80 is resuming normal operation. However, this is not essential and SC 24 may presume that such has occurred following sending of the RSEST command. Either arrangement is useful. Following step 120, method 100 returns to START 102 and initial query 104 as shown by path 121. The above-described method is fail-safe, in the sense that even though a RESET command has been received by MDC 80, a subsequent GRC 46 will not be executed unless VCDF 82 determines that such new command is valid, since data verification steps 104, 106 are performed on each command received independent of the immediate history. This is desirable but not essential.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A spacecraft attitude control system (SACS), comprising:

an attitude control processor (ACP) for generating attitude change commands;

a control moment gyro (CMG) coupled to the spacecraft for executing the attitude change commands to alter orientation of the spacecraft; and a motion damping controller (MDC) coupled between the CMG and the ACP and adapted to, (i) during normal operation of the SACS, receive attitude change commands from the ACP and pass on such commands to the CMG for execution, and (ii) during an emergency mode of operation when such attitude change commands are invalid, unavailable or interrupted or a combination thereof, modifying operation of the CMG to gradually reduce any then existing rotation of the spacecraft to a predetermined quiescent state.

2. The system of claim 1, wherein the CMG comprises:

a gimbal loop controller (GLC) coupled to the MDC for receiving attitude change commands and other signals; and a gimbal motor and gimbal assembly having an electrical input coupled to the GLC and a mechanical torque output coupled to the spacecraft.

3. The system of claim 2, wherein the GLC comprises:

an adder having a first input for receiving attitude change commands from the MDC and an opposite polarity second input for receiving rotational rate information from the gimbal assembly or spacecraft, and a first output; and an error amplifier having a third input coupled to the first output and having a second output coupled to the electrical input of the gimbal motor, wherein the error amplifier is adapted to have a first transfer function during normal operation and a second transfer function during the emergency mode of operation, selectable by the MDC via one or more of the other signals.

4. The system of claim 3, wherein the GLC further comprises a limiter serially coupled between the error amplifier and the gimbal motor, wherein the limiter has a fourth input coupled to the second output and a third output coupled to the electrical input of the gimbal motor and a fifth input responsive to another of the other signals from the MDC for altering a transfer function of the limiter during the emergency mode of operation.

5. The system of claim 3, wherein the GLC further comprises a motor driver serially coupled between the error amplifier and the gimbal motor and further coupled to the MDC, wherein the motor driver is responsive to still another of the other signals from the MDC to alter its transfer function during the emergency mode of operation.

* * * * *